United States Patent
Dahl et al.

(10) Patent No.: US 12,361,210 B2
(45) Date of Patent: Jul. 15, 2025

(54) SYSTEM AND METHOD FOR IMPLEMENTING TECHNOLOGY INFRASTRUCTURE UPGRADES USING AN AUTOMATED ELECTRONIC DATA AGGREGATION TOOL

(71) Applicant: BANK OF AMERICA CORPORATION, Charlotte, NC (US)

(72) Inventors: Erik Dahl, Newark, DE (US); Pratap Dande, Saint Johns, FL (US); Rahul Yaksh, Austin, TX (US); Vishwanath Prasad Karra, McKinney, TX (US); Steven Allan Reich, Manalapan, NJ (US); Tileshia Brenda Alford, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 326 days.

(21) Appl. No.: 17/977,729

(22) Filed: Oct. 31, 2022

(65) Prior Publication Data
US 2024/0143912 A1 May 2, 2024

(51) Int. Cl.
*G06F 17/00* (2019.01)
*G06F 21/57* (2013.01)
*G06F 40/177* (2020.01)
*G06F 40/197* (2020.01)

(52) U.S. Cl.
CPC .......... *G06F 40/197* (2020.01); *G06F 21/577* (2013.01); *G06F 40/177* (2020.01)

(58) Field of Classification Search
CPC .... G06F 40/197; G06F 40/177; G06F 21/577; G06F 21/6236; H04L 63/102; H04L 41/0816; H04L 41/50; H04L 63/0281
USPC ......................................................... 715/225
See application file for complete search history.

(56) References Cited

U.S. PATENT DOCUMENTS

| | | | |
|---|---|---|---|
| 8,468,244 B2 | 6/2013 | Redlich | |
| 8,473,325 B2 | 6/2013 | Barnhill, Jr. | |
| 8,498,941 B2 | 7/2013 | Felsher | |
| 9,419,951 B1 | 8/2016 | Felsher | |
| 9,426,029 B2 | 8/2016 | Saavedra | |
| 9,590,872 B1 | 3/2017 | Jagtap | |
| 10,007,513 B2 | 6/2018 | Malladi | |
| 10,225,152 B1 * | 3/2019 | Roth | H04L 41/0894 |
| 10,268,753 B2 | 4/2019 | Bar-Or | |
| 10,275,502 B2 | 4/2019 | Hubmann | |

(Continued)

*Primary Examiner* — Jason T Edwards
(74) *Attorney, Agent, or Firm* — Moore & Van Allen PLLC; Nicholas C. Russell

(57) ABSTRACT

A system is provided for implementing technology infrastructure upgrades using an automated electronic data aggregation tool. In particular, the system may receive a request from an endpoint device to generate a technology remediation framework for remediating a technology infrastructure issue. In response to the request, the system may use an automated electronic data aggregation tool to receive data associated with the technology infrastructure issue from one or more data sources. The system may then automatically generate the technology remediation framework using the received data and present the framework to one or more users associated with the technology infrastructure issue. In this way, the system provides an efficient way to implement upgrades and remediate issues within a technology infrastructure.

17 Claims, 4 Drawing Sheets

(56) References Cited

U.S. PATENT DOCUMENTS

| | | |
|---|---|---|
| 10,845,791 B2 | 11/2020 | Cohen |
| 10,871,922 B2 | 12/2020 | East |
| 11,057,237 B2 | 7/2021 | Ansari |
| 11,093,146 B2 | 8/2021 | Karr |
| 11,354,058 B2 | 6/2022 | Bernat |
| 2006/0010497 A1* | 1/2006 | O'Brien ................. G06Q 10/10 726/26 |
| 2019/0369984 A1 | 12/2019 | Malladi |
| 2020/0012488 A1 | 1/2020 | Koval |
| 2020/0403854 A1* | 12/2020 | Arunachalam ..... H04L 41/0853 |
| 2021/0257065 A1 | 8/2021 | Mander |
| 2022/0052910 A1 | 2/2022 | Neelakantam |
| 2022/0066772 A1 | 3/2022 | Gowda |
| 2022/0091893 A1 | 3/2022 | Gold |
| 2022/0094600 A1* | 3/2022 | Khoo .................... H04L 63/102 |
| 2022/0222350 A1* | 7/2022 | Franzen ................ G06F 21/577 |

* cited by examiner

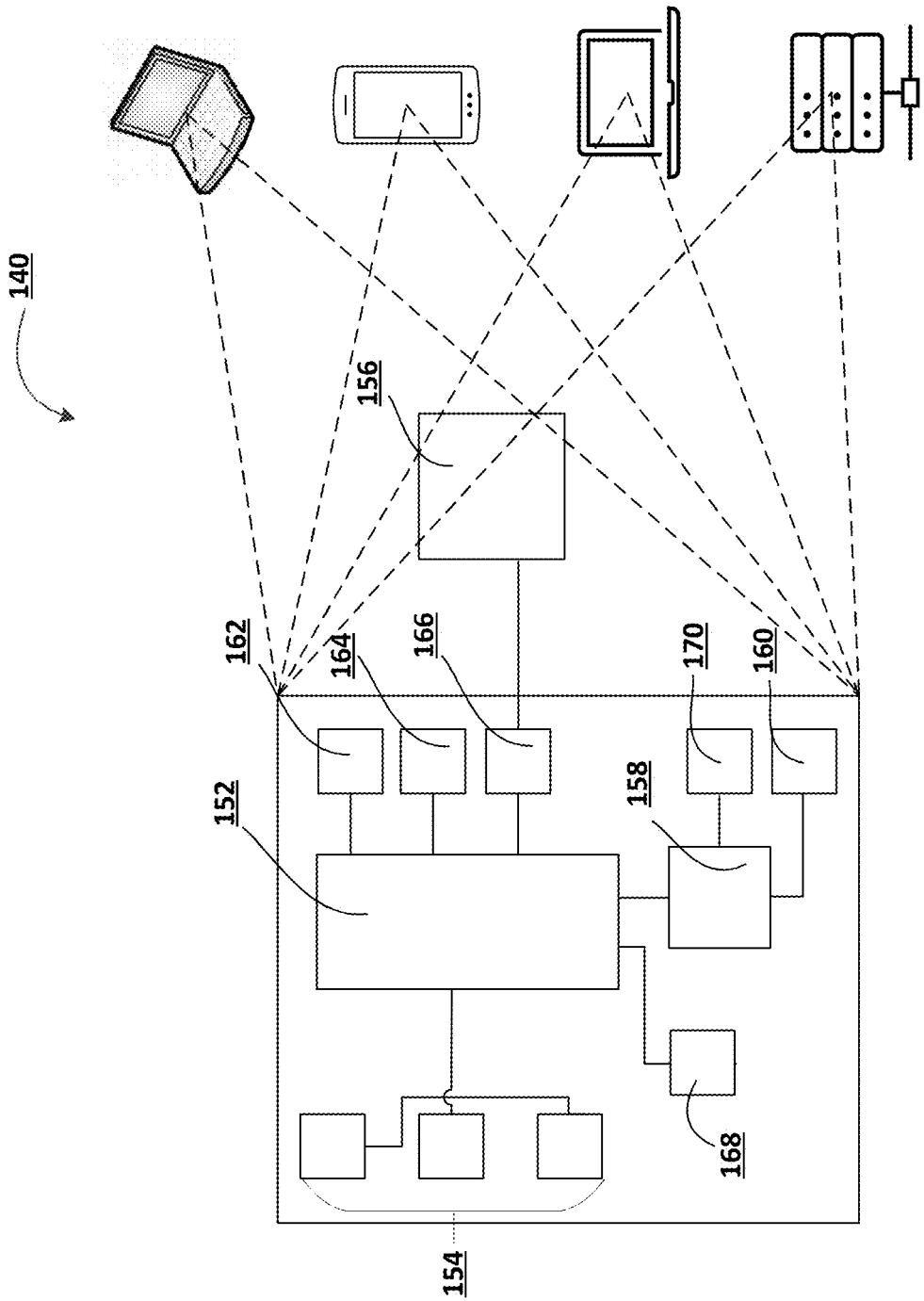

SYSTEM AND METHOD FOR IMPLEMENTING TECHNOLOGY INFRASTRUCTURE UPGRADES USING AN AUTOMATED ELECTRONIC DATA AGGREGATION TOOL

FIELD OF THE INVENTION

The present invention embraces a system and method for implementing technology infrastructure upgrades using an automated electronic data aggregation tool.

BACKGROUND

There is a need for an efficient way to implement upgrades to a technology infrastructure.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for implementing technology infrastructure upgrades using an automated electronic data aggregation tool. In particular, the system may receive a request from an endpoint device to generate a technology remediation framework for remediating a technology infrastructure issue. In response to the request, the system may use an automated electronic data aggregation tool to receive data associated with the technology infrastructure issue from one or more data sources. The system may then automatically generate the technology remediation framework using the received data and present the framework to one or more users associated with the technology infrastructure issue. In some embodiments, the technology infrastructure issue may be stored on a centralized server and be accessible to one or more concurrent users. The one or more concurrent users may then submit one or more concurrent edits to the framework. In this way, the system provides an efficient way to implement upgrades and remediate issues within a technology infrastructure.

Accordingly, embodiments of the present disclosure provide a system for implementing technology infrastructure upgrades using an automated electronic data aggregation tool, the system comprising at least one non-transitory storage device; and at least one processor coupled to the at least one non-transitory storage device, wherein the at least one processor is configured to receive, from an endpoint device, a request to generate a technology remediation framework for a target resource, wherein the request comprises a selection of the target resource and one or more additional parameters associated with the target resource; based on the request to generate the technology remediation framework, receive, through the automated electronic data aggregation tool, target resource data from one or more data sources associated with the target resource; generate the technology remediation framework based on the selection of the target resource, the one or more additional parameters, and the target resource data; and present the technology remediation framework on a graphical user interface of the endpoint device.

In some embodiments, receiving the request to generate the technology remediation framework comprises presenting a graphical user interface for the automated electronic data aggregation tool on the endpoint device, the graphical user interface comprising one or more interactable interface elements for receiving user input; and receiving the selection of the target resource and the one or more additional parameters through the one or more interactable interface elements.

In some embodiments, the request to generate the technology remediation framework further comprises a selection of an action for remediating a technology infrastructure issue, wherein the technology infrastructure issue comprises a security vulnerability, wherein the action comprises at least one of applying a software update or uninstalling a vulnerable software component.

In some embodiments, the technology remediation framework is a document file comprising a plurality of cells, wherein the plurality of cells is defined by one or more rows and one or more columns, wherein the plurality of cells is populated based on the target resource, the one or more additional parameters, and the target resource data.

In some embodiments, the technology remediation framework is configured to be accessible and editable by a plurality of concurrent users.

In some embodiments, generating the technology remediation framework further comprises transmitting a notification to a group of endpoint devices associated with the target resource, wherein the notification comprises an interactive link that, when activated, automatically presents the technology remediation framework on each endpoint device within the group of endpoint devices.

In some embodiments, the one or more additional parameters comprises at least one of a remediation status, an estimated duration for remediation, and an estimated completion time.

Embodiments of the present disclosure also provide a computer program product for implementing technology infrastructure upgrades using an automated electronic data aggregation tool, the computer program product comprising a non-transitory computer-readable medium comprising code causing an apparatus to receiving, from an endpoint device, a request to generate a technology remediation framework for a target resource, wherein the request comprises a selection of the target resource and one or more additional parameters associated with the target resource; based on the request to generate the technology remediation framework, receiving, through the automated electronic data aggregation tool, target resource data from one or more data sources associated with the target resource; generating the technology remediation framework based on the selection of the target resource, the one or more additional parameters, and the target resource data; and presenting the technology remediation framework on a graphical user interface of the endpoint device.

In some embodiments, receiving the request to generate the technology remediation framework comprises presenting a graphical user interface for the automated electronic data aggregation tool on the endpoint device, the graphical user interface comprising one or more interactable interface elements for receiving user input; and receiving the selection of the target resource and the one or more additional parameters through the one or more interactable interface elements.

In some embodiments, the request to generate the technology remediation framework further comprises a selection of an action for remediating a technology infrastructure issue, wherein the technology infrastructure issue comprises a security vulnerability, wherein the action comprises at least one of applying a software update or uninstalling a vulnerable software component.

In some embodiments, the technology remediation framework is a document file comprising a plurality of cells, wherein the plurality of cells is defined by one or more rows and one or more columns, wherein the plurality of cells is populated based on the target resource, the one or more additional parameters, and the target resource data.

In some embodiments, the technology remediation framework is configured to be accessible and editable by a plurality of concurrent users.

In some embodiments, generating the technology remediation framework further comprises transmitting a notification to a group of endpoint devices associated with the target resource, wherein the notification comprises an interactive link that, when activated, automatically presents the technology remediation framework on each endpoint device within the group of endpoint devices.

In some embodiments, the one or more additional parameters comprises at least one of a remediation status, an estimated duration for remediation, and an estimated completion time.

Embodiments of the present disclosure also provide a computer-implemented method for implementing technology infrastructure upgrades using an automated electronic data aggregation tool, the computer-implemented method comprising receiving, from an endpoint device, a request to generate a technology remediation framework for a target resource, wherein the request comprises a selection of the target resource and one or more additional parameters associated with the target resource; based on the request to generate the technology remediation framework, receiving, through the automated electronic data aggregation tool, target resource data from one or more data sources associated with the target resource; generating the technology remediation framework based on the selection of the target resource, the one or more additional parameters, and the target resource data; and presenting the technology remediation framework on a graphical user interface of the endpoint device.

In some embodiments, receiving the request to generate the technology remediation framework comprises presenting a graphical user interface for the automated electronic data aggregation tool on the endpoint device, the graphical user interface comprising one or more interactable interface elements for receiving user input; and receiving the selection of the target resource and the one or more additional parameters through the one or more interactable interface elements.

In some embodiments, the request to generate the technology remediation framework further comprises a selection of an action for remediating a technology infrastructure issue, wherein the technology infrastructure issue comprises a security vulnerability, wherein the action comprises at least one of applying a software update or uninstalling a vulnerable software component.

In some embodiments, the technology remediation framework is a document file comprising a plurality of cells, wherein the plurality of cells is defined by one or more rows and one or more columns, wherein the plurality of cells is populated based on the target resource, the one or more additional parameters, and the target resource data.

In some embodiments, the technology remediation framework is configured to be accessible and editable by a plurality of concurrent users.

In some embodiments, generating the technology remediation framework further comprises transmitting a notification to a group of endpoint devices associated with the target resource, wherein the notification comprises an interactive link that, when activated, automatically presents the technology remediation framework on each endpoint device within the group of endpoint devices The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
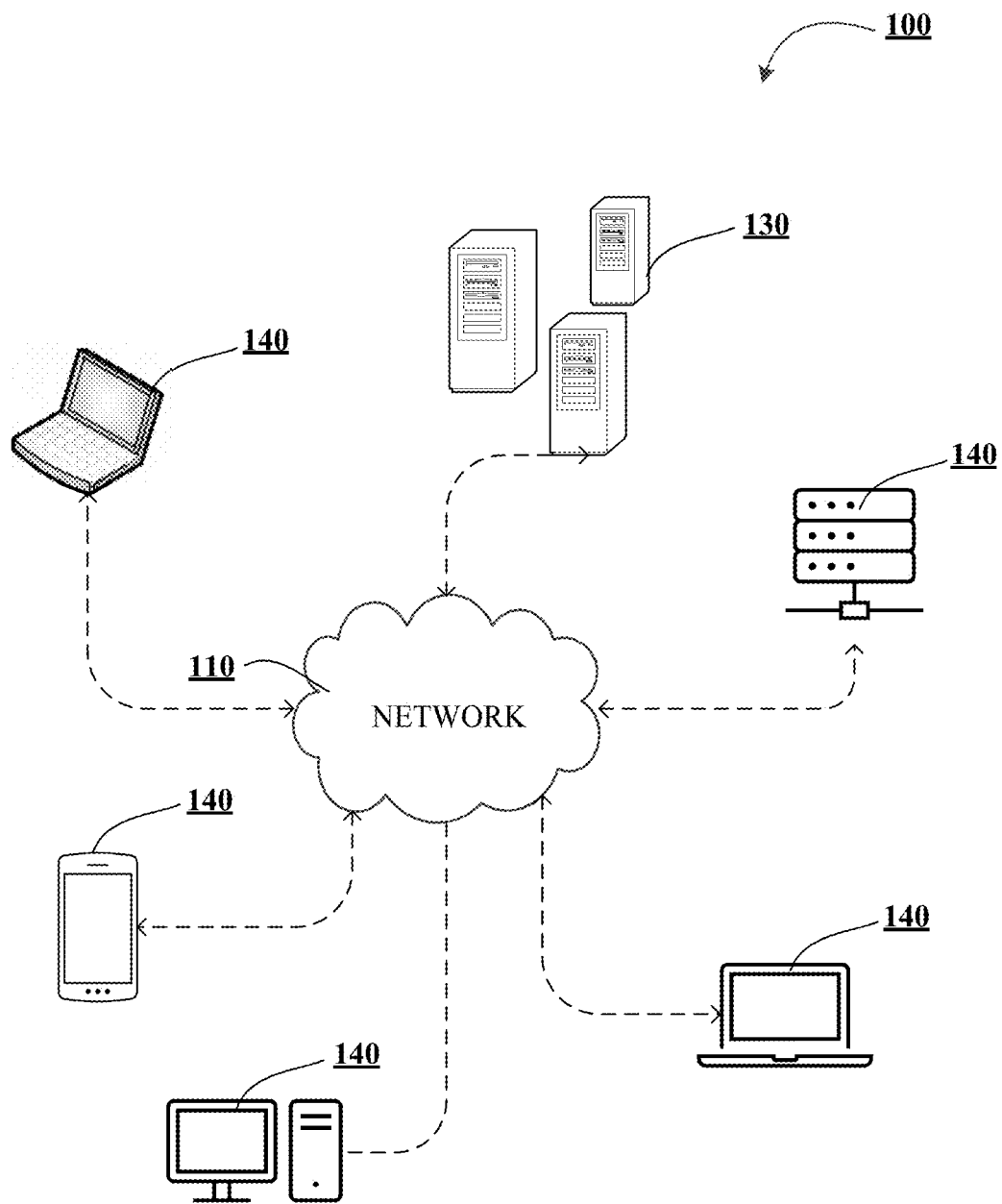
Figure 1B:
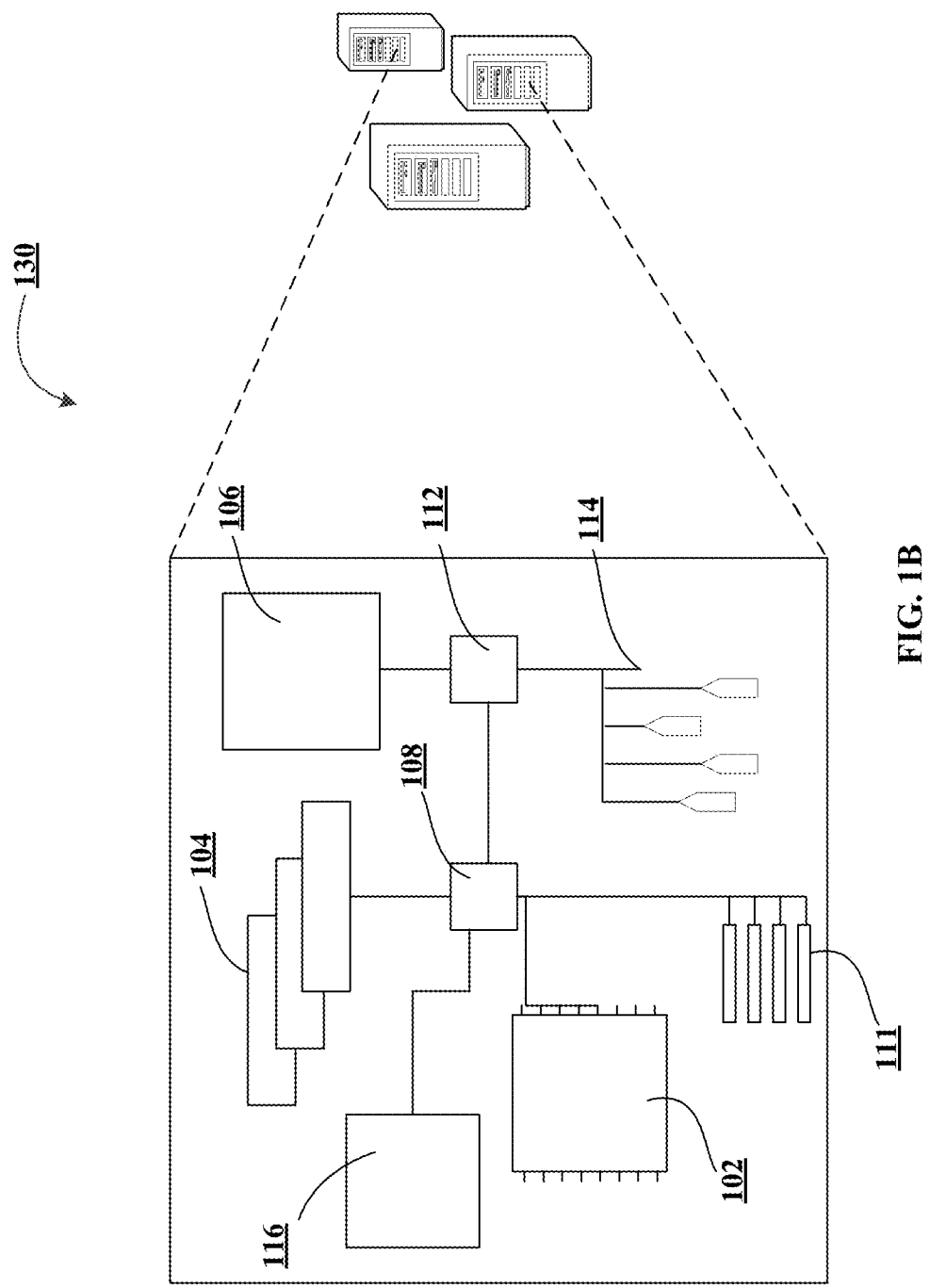
Figure 2:
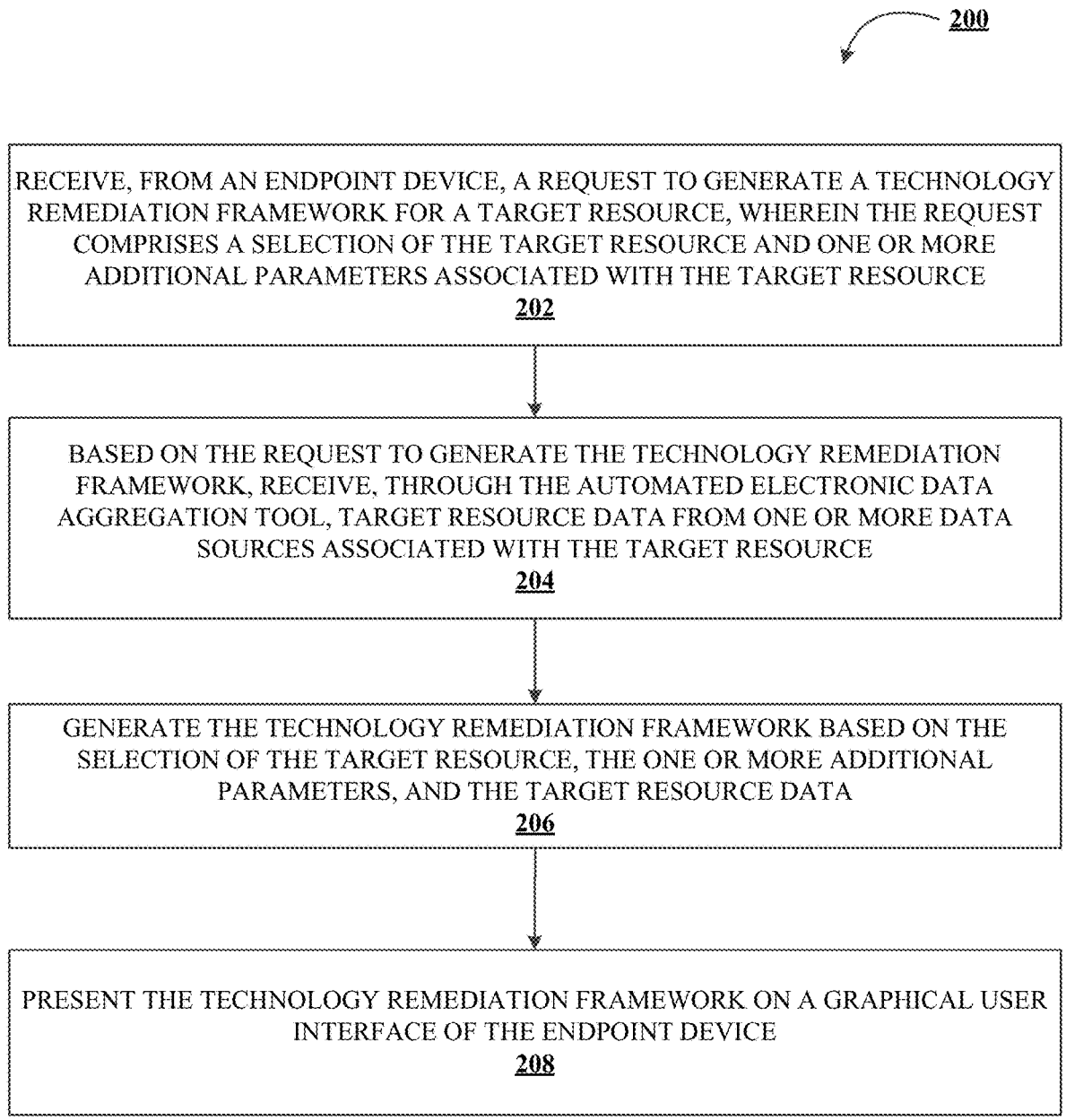

Having thus described embodiments of the invention in general terms, reference will now be made the accompanying drawings, wherein:

FIGS. 1A-1C illustrates technical components of an exemplary distributed computing environment for the system for implementing technology infrastructure upgrades using an automated electronic data aggregation tool, in accordance with an embodiment of the present disclosure;

FIG. 2 illustrates a process flow for implementing technology infrastructure upgrades using an automated electronic data aggregation tool, in accordance with an embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface ("GUI") or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, personalized characteristic information (e.g., iris recognition, retina scans, fingerprints, and/or the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may generally refer to physical or virtual objects that may be used to accomplish the entity's objectives. In this regard, the resources may include technology related hardware devices (e.g., desktop computers, servers, laptop computers, computer components, routers, hubs, switches, and/or the like), software (e.g., applications, libraries, data files, and/or the like), or computing resources such as processing power, memory allocation, cache space, storage space, data files, network connections and/or bandwidth, electrical power, input/output functions, and the like, or data files (e.g., document files, media files, system files, and/or the like).

During the course of operation, an entity's technology infrastructure may require certain changes or upgrades to be made to resolve issues that may arise over time. For instance, a software application or library deployed within the network environment may need to be patched, updated, or removed (e.g., the currently deployed application version is subject to a security vulnerability). That said, performing manual remediation of the technology-related issue may be a time and resource intensive process, particularly if the target resource of the remediation (e.g., the application) is deployed in tens or hundreds of thousands of instances across a plurality of computing devices.

To address the foregoing among other scenarios, embodiments of the present disclosure provide a system for implementing technology infrastructure upgrades using an automated electronic data aggregation tool. The electronic data aggregation tool may be configured to receive an input from a user regarding a technology resource to be upgraded, modified, removed, or otherwise remediated. For instance, a user such as an administrator or employee of an entity may transmit a request to generate a technology remediation framework for a resource to be remediated. For example, a driver or library installed across various computing systems within the network environment may be causing a compatibility issue with other installed applications and/or software on the affected computing systems (e.g., the installed driver causes system latency, application instability, and/or the like).

The request may include one or more selections by the user that may be used to configure the technology remediation framework. For example, the one or more selections may include a selection of a particular resource (e.g., software application, hardware device, and/or the like) to be remediated. In this regard, the system may present a graphical user interface of a configurator to the endpoint device, where the graphical user interface may comprise one or more interactable interface elements for receiving user input (e.g., text entry fields, drop down menus, radio buttons, clickable buttons, and/or the like). Accordingly, in an exemplary embodiment, the user may select the target resource by typing at least a portion of the name of the target resource into a text entry field (e.g., Python). The one or more selections may further include a selection of a type of remediation to be executed on the target resource (e.g., software update or upgrade, patch, configuration change, installation and/or removal of components, and/or the like).

In some embodiments, the one or more selections may also comprise additional parameters to be included in the technology remediation framework. For instance, the additional parameters may include a time estimate for completing the remediation, actions that must be executed for the remediation, a status of each step or action in the remediation process, a cost estimate for the remediation, a location of tools and/or data files to be used in remediation (e.g., a URL or download link for a security update patch file), and/or the like.

Based on the information contained in the request received from the endpoint device, the system may pull and/or receive data associated with the target resource (which may be referred to herein as "target resource data") from one or more data sources. The one or more data sources may include, for instance, manufacturer databases and/or servers, production environment servers, third party intelligence data feeds, and/or the like, which may include data associated with the target resource, such as product information, version information, patch URL's or addresses, contact names or associated users with the target resource, vendor names, support information, and/or the like.

Subsequently, the system may generate the technology remediation framework based on the request (including the selections and parameters set by the request) and the target resource data pulled from the one or more data sources. In some embodiments, the technology remediation framework may take the form of a spreadsheet document file comprising one or more rows and one or more columns, where the one or more rows may be populated by the instances of the target resource (e.g., the installations of a particular application on various computing systems within the network environment), and the one or more columns may be populated based on the parameters as read from the request (e.g., remediation status, estimated completion time, actions to be executed, and/or the like). Once the technology remediation framework has been generated, the system may present the technology remediation framework to one or more endpoint devices on the network. In some embodiments, the system may be configured to transmit a notification to one or more users associated with the target resource. For instance, a group of administrators may be responsible for maintaining a particular group of servers that hosts the target resource (e.g., a library that needs to be updated). In such embodiments, the notification may be sent to the group of administrators, where the notification comprises an interactive link that, when activated, causes the technology remediation framework to be displayed on the computing devices associated with each of the administrators. Upon accessing the framework, the administrators may begin the process of performing the required upgrade on the affected computing devices and/or resources.

In some embodiments, the technology remediation framework may be stored as a "live," unified version on a centralized server such that the technology remediation framework may be simultaneously accessible and editable by a plurality of users. In this regard, the technology remediation framework may be presented as part of a web application which allows users to edit the contents of the technology remediation framework (e.g., adding content, rows, or columns, changing or deleting values, and/or the like) as well as access certain functions for viewing or managing the framework (e.g., filtering, formatting, delegating, reassigning, setting permissions, and/or the like). Accordingly, a first user may access and edit the framework on a first endpoint device in parallel with a second user who may access and edit the same framework on a second endpoint device. Any changes made by either the first user or the second user will be saved and persist in the unified version of the technology remediation framework.

An exemplary embodiment is described as follows for illustrative purposes only and is not intended to restrict the scope of the disclosure provided herein. In one embodiment, a user may submit a request to generate a technology remediation framework with respect to a version of Python (e.g., the target resource) that is subject to a security vulnerability, where the target resource may be installed on a number of servers in the network environment. The user may select the target resource from a drop down menu in the graphical interface presented by the system, and further specify additional parameters that may need to be defined to perform the remediation (e.g., an update to a newer version of Python). Once the user has defined the relevant parameters using the configurator, the system may pull data from various sources (e.g., internal databases, vendor or manufacturer repositories, third-party intelligence data regarding vulnerabilities affecting the target resource, and/or the like) and generate the technology remediation framework based on the pulled data and the request submitted by the user. Once the framework has been generated, the framework may be presented to one or more users associated with the target resource.

The system as described herein provides a number of technological benefits over conventional infrastructure remediation solutions. In particular, by using the data aggregation and library technologies as described herein, the system may increase the efficiency of the technology upgrade process within the network environment. Furthermore, by presented a live version of the technology remediation framework, the system may prevent instances of duplication of effort or file versioning conflicts, thereby saving computing resources such as processing power, networking bandwidth, data storage space, memory allocation space, I/O calls, and/or the like.

FIGS. 1A-1C illustrate technical components of an exemplary distributed computing environment 100 for the system for implementing technology infrastructure upgrades using an automated electronic data aggregation tool. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer—or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for implementing technology infrastructure upgrades using an automated electronic data aggregation tool, in accordance with an embodiment of the present disclosure. The process begins at block 202, where the system receives, from an endpoint device, a request to generate a technology remediation framework for a target resource, wherein the request comprises a selection of the target resource and one or more additional parameters associated with the target resource. The request may be submitted through a graphical user interface presented on a display device of the endpoint device. Accordingly, the graphical user interface may comprise one or more interactable interface elements configured for receiving user inputs associated with the target resource. For instance, the interface elements may include elements (e.g., text entry field, drop down menu, or the like) for receiving the selection of the target resource (e.g., the user may identify the target resource from a predefined list of resources available for remediation or alternatively define a new target resource for remediation), a selection of the one or more additional parameters (e.g., remediation status, estimated completion time, estimated time duration for remediation, and/or the like), a selection of remediation actions (e.g., applying a patch or update, installing remediation software such as an antivirus, removal of a problematic hardware device, uninstalling a vulnerable software component, installing additional drivers and/or libraries, and/or the like).

In an exemplary embodiment, a user may submit a request (e.g., through the endpoint device) to generate the framework with respect to a software application that is causing a compatibility issue with other existing software on the computing devices on which the software application is installed. In such embodiments, remediating the issue may include applying an update to the software application. Accordingly, the one or more additional parameters may include a version number of the software application and/or update, a path or link to the update files, an installation method for the update, and/or the like.

The process continues to block 204, where the system, based on the request to generate the technology remediation framework, receives, through the automated electronic data aggregation tool, target resource data from one or more data sources associated with the target resource. The one or more data sources may include, for instance, internal databases regarding the target resource (which may include the locations in which the target resource has been installed or deployed), vendor or manufacturer databases (which may include documentation regarding the target resource), third party intelligence data feeds (which may include information such as security bulletins regarding vulnerabilities affecting the target resource), and/or the like. Continuing the above example, the target resource data may include a URL for the update patch file, version numbers, and/or the like.

In some embodiments, the one or more data sources may include a historical technology remediation framework database containing past technology remediation frameworks that have been generated by the system. Accordingly, the system may access previously generated technology remediation frameworks to access data regarding previous remediations that have been executed on various types of resources. Based on such information, the system may perform at least a portion of the computations needed to populate the technology remediation framework. For instance, based on previous completion times for remediation of certain technology resources, the system may compute estimated completion times for future technology remediation frameworks.

The process continues to block 206, where the system generates the technology remediation framework based on the selection of the target resource, the one or more additional parameters, and the target resource data. In some embodiments, the technology remediation framework may take the form of a document file with a plurality of cells defined by one or more rows and one or more columns. The one or more rows may be populated with a list of devices or products requiring remediation, whereas the one or more columns may include the one or more additional parameters, such as the name of the target resource, status of remediation, estimated duration for remediation, and/or the like. Accordingly, the plurality of cells may be automatically populated from the target resource data pulled from the one or more data sources. For instance, if the one or more columns include cells for estimated completion times for the remediation of a particular computing device or instance, the system may compute the estimated completion times based on the data read from past technology remediation frameworks stored in the historical technology remediation framework database.

The process continues to block 208, presents the technology remediation framework on a graphical user interface of the endpoint device. In some embodiments, the technology remediation framework may be presented to one or more users through a web-based application configured to be accessible, readable, and/or editable by a plurality of concurrent users. In this way, multiple users may submit changes or feedback, and/or edit the contents of the technology remediation framework in parallel with one another. Any changes made by any of the users may be automatically saved in the technology remediation framework, thereby preventing the possibility of versioning conflicts or differences. In some embodiments, once the technology remediation framework has been generated, the system may transmit a notification to a group of endpoint devices associated with the target resource, where the notification may comprise an interactive link that, when activated, causes the technology remediation framework to be automatically presented as a web application on each of the endpoint devices within the group of endpoint devices.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for implementing technology infrastructure upgrades using an automated electronic data aggregation tool, the system comprising:
   at least one non-transitory storage device; and
   at least one processor coupled to the at least one non-transitory storage device, wherein the at least one processor is configured to:
   receive, from an endpoint device, a request to generate a technology remediation framework for a target resource, wherein the request comprises a selection of the target resource and one or more additional parameters associated with the target resource;
   based on the request to generate the technology remediation framework, receive, through the automated electronic data aggregation tool, target resource data from one or more data sources associated with the target resource, wherein the one or more data sources comprise internal databases where the target resource is installed and deployed, and wherein the target resource data is a URL for an update patch file;

generate the technology remediation framework based on the selection of the target resource, the one or more additional parameters, and the target resource data, wherein the technology remediation framework is a document file comprising a plurality of cells, wherein the plurality of cells is defined by one or more rows and one or more columns, wherein the plurality of cells is populated based on the target resource, the one or more additional parameters, and the target resource data; and present the technology remediation framework on a graphical user interface of the endpoint device.

2. The system of claim 1, wherein receiving the request to generate the technology remediation framework comprises:

presenting a graphical user interface for the automated electronic data aggregation tool on the endpoint device, the graphical user interface comprising one or more interactable interface elements for receiving user input; and receiving the selection of the target resource and the one or more additional parameters through the one or more interactable interface elements.

3. The system of claim 1, wherein the request to generate the technology remediation framework further comprises a selection of an action for remediating a technology infrastructure issue, wherein the technology infrastructure issue comprises a security vulnerability, wherein the action comprises at least one of applying a software update or uninstalling a vulnerable software component.

4. The system of claim 1, wherein the technology remediation framework is configured to be accessible and editable by a plurality of concurrent users.

5. The system of claim 1, wherein generating the technology remediation framework further comprises transmitting a notification to a group of endpoint devices associated with the target resource, wherein the notification comprises an interactive link that, when activated, automatically presents the technology remediation framework on each endpoint device within the group of endpoint devices.

6. The system of claim 1, wherein the one or more additional parameters comprises at least one of a remediation status, an estimated duration for remediation, and an estimated completion time.

7. A computer program product for implementing technology infrastructure upgrades using an automated electronic data aggregation tool, the computer program product comprising a non-transitory computer-readable medium comprising code causing an apparatus to:

receiving, from an endpoint device, a request to generate a technology remediation framework for a target resource, wherein the request comprises a selection of the target resource and one or more additional parameters associated with the target resource;

based on the request to generate the technology remediation framework, receiving, through the automated electronic data aggregation tool, target resource data from one or more data sources associated with the target resource, wherein the one or more data sources comprise internal databases where the target resource is installed and deployed, and wherein the target resource data is a URL for an update patch file;

generating the technology remediation framework based on the selection of the target resource, the one or more additional parameters, and the target resource data, wherein the technology remediation framework is a document file comprising a plurality of cells, wherein the plurality of cells is defined by one or more rows and one or more columns, wherein the plurality of cells is populated based on the target resource, the one or more additional parameters, and the target resource data; and presenting the technology remediation framework on a graphical user interface of the endpoint device.

8. The computer program product of claim 7, wherein receiving the request to generate the technology remediation framework comprises:

presenting a graphical user interface for the automated electronic data aggregation tool on the endpoint device, the graphical user interface comprising one or more interactable interface elements for receiving user input; and receiving the selection of the target resource and the one or more additional parameters through the one or more interactable interface elements.

9. The computer program product of claim 7, wherein the request to generate the technology remediation framework further comprises a selection of an action for remediating a technology infrastructure issue, wherein the technology infrastructure issue comprises a security vulnerability, wherein the action comprises at least one of applying a software update or uninstalling a vulnerable software component.

10. The computer program product of claim 7, wherein the technology remediation framework is configured to be accessible and editable by a plurality of concurrent users.

11. The computer program product of claim 7, wherein generating the technology remediation framework further comprises transmitting a notification to a group of endpoint devices associated with the target resource, wherein the notification comprises an interactive link that, when activated, automatically presents the technology remediation framework on each endpoint device within the group of endpoint devices.

12. The computer program product of claim 7, wherein the one or more additional parameters comprises at least one of a remediation status, an estimated duration for remediation, and an estimated completion time.

13. A computer-implemented method for implementing technology infrastructure upgrades using an automated electronic data aggregation tool, the computer-implemented method comprising:

receiving, from an endpoint device, a request to generate a technology remediation framework for a target resource, wherein the request comprises a selection of the target resource and one or more additional parameters associated with the target resource;

based on the request to generate the technology remediation framework, receiving, through the automated electronic data aggregation tool, target resource data from one or more data sources associated with the target resource, wherein the one or more data sources comprise internal databases where the target resource is installed and deployed, and wherein the target resource data is a URL for an update patch file;

generating the technology remediation framework based on the selection of the target resource, the one or more additional parameters, and the target resource data, wherein the technology remediation framework is a document file comprising a plurality of cells, wherein the plurality of cells is defined by one or more rows and one or more columns, wherein the plurality of cells is populated based on the target resource, the one or more additional parameters, and the target resource data; and presenting the technology remediation framework on a graphical user interface of the endpoint device.

14. The computer-implemented method of claim 13, wherein receiving the request to generate the technology remediation framework comprises:

presenting a graphical user interface for the automated electronic data aggregation tool on the endpoint device, the graphical user interface comprising one or more interactable interface elements for receiving user input; and receiving the selection of the target resource and the one or more additional parameters through the one or more interactable interface elements.

15. The computer-implemented method of claim 13, wherein the request to generate the technology remediation framework further comprises a selection of an action for remediating a technology infrastructure issue, wherein the technology infrastructure issue comprises a security vulnerability, wherein the action comprises at least one of applying a software update or uninstalling a vulnerable software component.

16. The computer-implemented method of claim 13, wherein the technology remediation framework is configured to be accessible and editable by a plurality of concurrent users.

17. The computer-implemented method of claim 13, wherein generating the technology remediation framework further comprises transmitting a notification to a group of endpoint devices associated with the target resource, wherein the notification comprises an interactive link that, when activated, automatically presents the technology remediation framework on each endpoint device within the group of endpoint devices.

* * * * *